United States Patent [19]
Cravero

[11] Patent Number: 6,033,691
[45] Date of Patent: Mar. 7, 2000

[54] PROCESS FOR MANUFACTURING A BIOLOGICALLY ACTIVE FERMENTED MILK PRODUCT AND PRODUCT OBTAINED BY THE PROCESS

[75] Inventor: Ricardo Alberto Cravero, Sunchales, Argentina

[73] Assignee: Sancor Cooperativas Unidas Limitada, Sunchales, Argentina

[21] Appl. No.: 09/156,004

[22] Filed: Sep. 17, 1998

Related U.S. Application Data

[63] Continuation-in-part of application No. 08/663,359, Jun. 13, 1996, abandoned.

[51] Int. Cl.$^7$ ............... A23C 17/00; A23C 9/00; A23C 9/16
[52] U.S. Cl. ............... 426/43; 426/583; 426/587; 426/588
[58] Field of Search ............... 426/34, 42, 43, 426/580, 583, 587, 588

[56] References Cited

U.S. PATENT DOCUMENTS

| | | | |
|---|---|---|---|
| 3,689,640 | 9/1972 | Shahani et al. | 424/118 |
| 4,588,595 | 5/1986 | Okonogi et al. | 426/43 |
| 5,759,598 | 6/1998 | Gaier | 426/56 |
| 5,811,289 | 9/1998 | Lewandowski et al. | 435/262 |

FOREIGN PATENT DOCUMENTS

| | | | |
|---|---|---|---|
| 9501107 | 6/1996 | Brazil | A23C 9/123 |

OTHER PUBLICATIONS

Nader de Macias et al. *J. Applied Bacteriology* 73(5): 407–411, 1992.
Gonzales et al. *Microbiologie, Ailments, Nutrition* 8(4): 349–354, 1990.
Perdigon et al. *J. Dairy Research* 57(2): 255–264, 1990.
Perdigon et al. *Foods, Nutrition, and Immunity:* effects of dairy and fermented milk products. Paubert–Braquet eds., p. 66–76, 1992.
Patel et al. *Indian J. Dairy Sci.*, 14(7) 372–382, 1992.

*Primary Examiner*—Keith D. Hendricks
*Attorney, Agent, or Firm*—Darby & Darby

[57] ABSTRACT

The present invention relates to a method for the preparation of a biologically active milk product. *Lactobacillus Casei* (ATCC 55544) and *Lactobacillus Acidophilus* (ATCC 55543) are simultaneously inoculated in milk previously added with Streptococcus, and then fermented. Fermentation results in the formation of a biologically active milk product. After fermentation, the resulting product can be stores between 4° C. and 10° C. for up to 30 days. Storage of the product does not require any special container. The product can also be lyophilized and stored at 20° C. to 25° C. (relative humidity 40–65%) for a minimum of four (4) months. When reconstituted, the powdered product has a pH close to liquid and is palatable.

19 Claims, No Drawings

PROCESS FOR MANUFACTURING A BIOLOGICALLY ACTIVE FERMENTED MILK PRODUCT AND PRODUCT OBTAINED BY THE PROCESS

This application is a continuation-in-part of application Ser. No. 08/663,359, filed Jun. 13, 1996 now abandoned.

BACKGROUND OF THE INVENTION

1. Field of the Invention

The present invention relates to the diary industry and provides new diary products in the form of direct consumption fermented milk or as a product of instantaneous reconstitution, such as in concentrated fermented milk and fermented milk powder, having an extended shelf life, the products resulting from the culture in symbiosis of specific bacterias in a substrate comprising milk, whole milk, skim milk, lactosefree milk, etc.

2. Description of the Prior Art

The diary industry has experienced deep changes, therefore it is not only of interest to provide the market with supply natural milk or to process the milk in order to offer its traditional derivatives: cheese, yogurt, etc., but the diary industry's evolution allows that other products and milk derivatives are today available. An important innovation was produced when diary products were offered for the purpose of modifying and improving dietary habits and correcting deficient status in human health conditions, mainly of those who depend on the intestinal bacterial flora or on ingestion of vitamins, minerals (calcium, phosphorous, iron). In this regard, the diary industry has developed and proposed diary products derived from the treatment of milk with lactic bacteria, compatible with the nutritional demand of the modern consumer market.

The satisfaction of these biological demands (and also the market's) has introduced various innovations, such as yogurt and whole or skim milk, products combined with fruits or with cereal milks (soya, sunflower) and also cultured milk, acidophile milk, fermented milk, etc.

To obtain these fermented products, it is of vital importance, in regard to the activity and probiotic (nutritional) capacity of the products, the characteristics of the lactic strains utilized, requirement which obliges to be extremely careful about the relationship between lactic strains.

This demand has promoted the search for new lactic strains, capable of generating lactic based products with probiotic properties (prevention-control-correction of diarrehoeic processes, activation of the immunologic system, prevention of hyper-cholesterolemia, etc.)

It has recently been realized that it is possible to have available new diary products—particularly fermented milks and derivatives of same—including varieties of concentrated and dehydrated (or powder) fermented milk of immediate reconstitution, by growing simultaneous cultures in the same medium of Lactobacillus Casei CRL 341 (ATCC 55544) and Lactobacillus Acidophilus CRL 730 (ATCC 55543). They are two symbiotic lactic strains, so that the symbiotic results in the attainment of biologically active fermented milk products, mainly as a result of the population of viable cells developed in the range of not less than $10^6$ to $10^9$ CFU/ml.

It is known to provide milk products fermented by inoculation of culture cells, particularly cells of Lactobacillus Casei and Lactobacillus Acidophilus.

This is disclosed in Gonzales et al. (Microbiologie, Ailments, Nutritions 8(4): 349–354, 1990), Perdigon et al. (J. Dairy res. 57(2): 255–264, May 1990), Perdigon et al. (Foods, Nutrition, and Immunity: effects of dairy and fermented milk products. Paubert-Braquet eds., 1992, p66–76), Patel et al. (Indian J. Dairy Sci. 14(7): 379–382, 1992) or Nader de Macias et al. (J. Applied Bacteriology 73(5): 407–411, November 1992).

Gonzales et al. teaches the preparation of a fermented milk product characterized by inoculating skim milk (i.e., a milk substrate) with a viable culture of Lactobacillus Casei and Lactobacillus Acidophilus wherein the microorganisms are at a final concentration of $10^7$ to $10^8$ cell/ml. Gonzales et al. also suggest the use of this cultured milk to alleviate diarrhea. Perdigon et al. (1990) and Perdigon et al. (1992) teach a fermented milk product containing a mixed culture of Lactobacillus Casei and Lactobacillus Acidophilus and the ability of this fermented milk product to boost the immune system. Patel et al. describes a fermented milk containing $5\times10^7$ viable cells of lactobacilli/ml having the strains Lactobacillus Casei and Lactobacillus Acidophilus. Nader de Macias et al. teaches a milk fermented product containing a mixture of Lactobacillus Casei and Lactobacillus Acidophilus. When fermented milk is prepared using the methods of the cited references, however, it has a short shelf life, e.g., a maximum of 7 days.

In addition, when the fermented milk is prepared using the methods described in the prior cited references, the Lactobacilli continue to produce lactic acid. Higher concentrations of lactic acid render the milk product inedible. It would be therefore very desirable to find a milk product that maintain the drinkable nature of the fermented milk product for longer periods of time, such as 30–60 days in liquid form or 4–6 months in powder form.

SUMMARY OF THE INVENTION

It is therefore an object of this invention to provide a product of liquid fermented milk, concentrated or in powder form of immediate reconstitution, that is a product formed by the symbiotic culture of Streptococcus Thermophilus, Lactobacillus Casei CRL 431 (ATCC 55544) and Lactobacillus Acidophilus CRL 730 (ATCC 55543) in a milk substratum, up to a concentration of viable cells of a lactobacillus of at least $10^5$ CFU/ml and recovering the resulting fermented milk powder.

It is another object of this invention to provide a procedure to obtain a biologically active fermented milk product, that includes the steps of inoculating a lactic based culture medium with an inoculum containing cells of Lactobacillus Casei CRL 431 (ATCC 55544) and Lactobacillus Acidophilus CRL 730 (ATCC 55543) precultured together in a lactic substratum and which includes the metabolites formed in said preculture, with a pH between 6 and 6.70 and to culture the cells of the inoculum up to a populations of at least $10^5$ CFU/ml and recovering the resulting fermented milk product.

It is another object of the inventions to provide a fermented milk product, with clinically tested probiotic characteristics, comprising the product formed by the culture of cells of Lactobacillus Casei CRL 431 (ATCC 55544) and Lactobacillus Acidophilus CRL 730 (ATCC 55543) precultured together in a lactic substratum and which includes the metabolites formed in said preculture, with a ph between 6 and 6.70 and to culture the inoculum cells, up to a population of at least $10^5$ CFU/ml and recovering the resulting fermented milk product.

It is still another object of the invention to provide a process to obtain an inoculum containing two Lactobacillus strains, including the inoculation, in a lactic base culture medium conditioned with oligoelements and additives of cells of *Lactobacillus Casei* CRL 431 (ATCC 55544) and *Lactobacillus Acidophilus* CRL 730 (ATCC 55543), at a ph between 6.30–6-60, up to a viable population of $10^6$–$10^9$ CFU/ml.

More specifically, it is still another object of the invention to provide a process for manufacturing a biologically active fermented milk product, comprising the steps of:

a) preparing a mixture comprising a fluid phase and adding maltodextrin, non-fatty powder milk and sugar to the fluid phase, the fluid phase having a 4% fat content;

b) homogenizing and pasteurizing the mixture, wherein homogenization is carried out in only one step and pasteurization is made in a plate-type device;

c) fermenting the mixture by adding *Streptococcus Thermophilus* at a temperature of 43° C. and a pH up to 4.5–4.6;

d) adding, under continuous and strong stirring, carboxymethylcellulose as a stabilizer until control parameters comprising pH: 4.55–4.65 and acidity: 63–70° D. are uniform in all the mixture;

e) homogenizing the mixture at 40° C. and 175 kg/cm$^2$ and letting the mixture to cool down to 4° C.; and f) inoculating the mixture with a bio ferment comprising cells of *Lactobacillus Acidophilus* and *Lactobacillus Casei*.

It is still an object of the present invention to rapidly reduce the acidity of the product, during preparation thereof, by adding a strain of *Streptococcus Thermophilus* by means of which an intensive proteolytic activity is achieved in the milk to thus obtain a milk product with a large quantity of aminoacids and small peptides that provides the product with a higher nutritional value. The cell line *Streptococcus Thermophilus,* specifically elected for use in this product, functions, during its active period, as a pH regulator, creating a symbiotic culture for all the cells in the medium.

The main differences between known lactic base products—fermented milk, yogurt, cultured milk, etc.—is that they are colonized by strains which probiotic properties have been only tested at a generic level. In the lactic base products of this invention, the probiotic properties have been researched, both in regard to the quality of the bacterial flora, as in the content of the active metabolites, both from a biochemical as from a clinical point of view.

Both the reconstituted products as well as the fluid or liquid of the invention products have organoleptic characteristics and physical-chemical properties similar to those of natural milk, and enriched, according to the invention, by the colonization with populations of the order of $10^6$ CFU viable *Lactobacillus Casei* CRL 431 ATCC 55544 and *Lactobacillus Acidophilus* CRL 730 ATCC 55543 in the presence of *Streptococcus Thermophilus*. The consumption of this product provides the human organism with milk's own compounds (lactose, lipids, proteins, etc.) peptides, and aminoacids resulting from the proteolytic activity of the *Streptococcus Thermophilus*. Furthermore, the lactobacillus population allows the maintenance of a balanced and controlled intestinal flora, in regards to the colonization by pathogens microbic species, besides, it allows the restoration of the intestinal population, frequently unbalanced by the administration of pharmaceutical products or by nutritional and sanitary deficiencies. Said invention also refers to a process to obtain said products from fermented milk.

The cell line *Lactobacillus Casei* CRL 431 (ATCC Designation 55544) and *Lactobacillus Acidophilus* CRL 730 (ATCC Designation 55543) were deposited on Jan. 24, 1994 with the American Type Collection (ATCC), an International Depositary Authority under the terms of the Budapest Treaty located at 12301 Parklawn Drive, Rockville, Md. U.S.A.

DETAILED DESCRIPTION OF THE INVENTION

The present invention provides for an industrial process starting at the quality control of the raw materials. All the intervene components are controlled and analyzed at laboratories to guarantee uniform quality in the final product.

A mixture is then prepared with a fluid phase having a 4% of fat content. Maltodextrin, non-fatty powder milk and sugar are added to the fluid phase in a tri-blender stirrer. Flavoring agents and scents may be also added. One or more control steps to determine density, acidity, pH, total solids, proteins, fat and total sugar contents and values may be also carried out. The organoleptic parameters such as look and flavor are also controlled.

Then, the mixture is homogenized and pasteurized with the homogenization being carried out in only one step and the pasteurization being carried out in a plate-type equipment. The process conditions are, homogenizations temperature: 70° C.; homogenizations pressure: 150 kg/cm$^2$; pasteurization temperature: 90° C.; temperature at the pasteurization outlet: 42–43° C.

The next step is fermentation comprising adding a *Streptococcus Thermophilus* ferment to the mix, the mix being maintained at a temperature of 43° C. The operation is stopped when reaching a pH 4.5–4.6.

The next step comprises adding stabilizing solutions with further homogenizing and cooling down. Stabilizers are added to the mixture under constant stirring in a tank until the control parameters are uniform all over the tank. The pH and acidity are controlled to keep them at pH: 4.55–4.65 and acidity: 63–70° D.

With a low pH it is guaranteed that the addition of stabilizers does not involve the entering of contaminants to the fermented mixture. Then, the mixture is further homogenized at 40° C. and 175 kg/cm$^2$ and is then cooled down to 4° C. in a plates-type equipments. The product is stored in a tank where a bio-ferment is added before fractionating of the product. The bio-ferment comprises cells of *Lactobacillus Acidophilus,* and *Lactobacillus Casei* the preparation of which are later disclosed.

The process is controlled at a cooler/tank line, wherein two samples are obtained by batch in order to determine population of coliforms, fungi and yeasts. In the storing tank the pH, the acidity, the viscosity, syneresis (centrifugation test), organoleptic are controlled. The control at this stage allows to determine contaminations and/or process errors before fractioning.

In the process of the present invention, a pair o different lactic cells operating in symbiosis is utilized as a bio-ferment. One of them is a strain of *Lactobacillus Casei* CRL 431 ATCC 55544 and the other is a strain of *Lactobacillus Acidophilus* CRL 730 ATCC 55543.

The simultaneous culture of the above mentioned strains in a milk medium or substratum results in the formation of a biologically active lactic product; this activity arises from an exuberant population of viable cells and from the metabolites accumulated in the medium during the culture of same.

The attainment of the fermented milk product of this inventions includes three steps, to wit; i) preparation of inocula containing both Lactobacillus; ii) culture of said Lactobacillus inoculated in a lactic base medium: whole milk, skim milk, homogenized milk, etc., if necessary, with oligoelements (iron, cobalt, molybdenum, etc.) and the necessary additives for growth and reproduction of the inoculated Lactobacillus; for instance, biotic, aminoacids, which selection and concentrations is regulated in accordance with the evolution of the Lactobacillus culture and also with selective criterias to limit or inhibit the development of other species; iii) termination of the fermentation and fractionation process and packing of the fermented milk product.

1) Preparation of the Lactobacillus inoculum

At this stage, the strains of *Lactobacillus Casei* CRL 431 ATCC 55544 and *Lactobacillus Acidophilus* CRL 730 ATCC 55543 are cultured in a lactic base medium, previously sterilized, for instance, by heating at 90° C. during 5–6 minutes. The product, sterilized and cooled to 37° C. is then conditioned with the addition of the additives mentioned on item ii), adjusting the pH between 6.50–6.75. Then, the strains of *Lactobacillus Casei* and *Lactobacillus Acidophilus* are inoculated on any order, taken from the strain bank and suspended in a sterile physiological solution. The incubation of the inoculum is initiated and continued at 37° C., during a period regulated by the counting of the viable flora, usually between $16^6$ and $10^9$ CFU/ml. During the culture period, it is important to maintain the pH between 6.30–6.60 adding buffer solutions, or biocompatible acids or bases.

A possible alternative is to incubate separately said *Lactobacillus Casei* and *Lactobacillus Acidophilus* strains, to gather together the individual cultures of said strains and to continue the culture of the combined strains until attaining a viable population between the above mentioned limits.

The resulting product may be utilized directly or processed for storage. this storage requires some prior conditioning operations before packaging. For instance, concentration by vacuum evaporation or lyophilization and also by freezing.

In all cases it has been noticed the preservation of the viable flora for periods not less than 6 months, for the stored products at 20° C.–40° C.

The packaging of the inoculation product is not related specifically to a given type of package, although in practice it is recommended to use cardboard "Tetra Rex" type packages (500 ml for the concentrated product) and 15 g pouches for the lyophilized product.

II) Culture of *Lactobacillus Casei* and *Lactobacillus Acidophilus*:

Preparation of fermented milk.

The above mentioned Lactobacillus are to be inoculated in a lactic base culture; that is to say, a medium constituted by conditions and supplemented milk, suitable for the symbiotic proliferation of the inoculated Lactobacillus. The culture medium base is whole cow's milk or also skim milk, supplemented with oligoelements and additives, as explained when describing the medium for the inoculum preparation.

For the inoculation of the conditions, supplemented and sterilized or pasteurized milk, the inoculating material described and prepared as per item 1, is introduced. The amount of inoculating material depends on the population of viable cells when dealing with an inoculum containing from $10^6$ to $10^9$ viable cells/ml, 2 g of inoculum/ml of the culture medium are enough, when it is lyophilized inoculum.

The culture of the inoculated strains requires to control temperatures between 30° C. and 45° C., preferably between 30° C. and 38° C., preferably between 35° C. and 38° C. and more especially at 37° C.±0.5° with a pH between 6.0 and 7.0, preferably between 6.30–6.50.

During the culture stages, a symbiotic relationship is established between *Lactobacillus Acidophilus*, which produces butyric acid, lactic acid acidifying the medium and *Lactobacillus Casei* which consumes these metabolites, maintaining a pH between 6.0 and 7.0 compatible to the survival of the inoculates species.

The culture operation is interrupted when a population of viable cells not less than $10^5$ and $10^9$ CFU/ml.

In the description of the steps I) and II), there should be highlighted the advantages of maintaining the culture medium under continuous agitation, for the purpose of conserving the medium's homogenization and temperature; either by means of mechanical stirring or by bubbling of air mixed with carbon dioxide.

III) Final operations.

To interrupt the lactic substratum by the inoculates lactic cells, the quick cooling of the fermented product, between 4° and 12° C., is utilized. This cooled product is ready to be consumed, its shelf life is from 20 to 60 days, if stored between 4° and 10° C. This product (drinkable fermented milk) does not require any special container: the product tolerates containers used for common milk: plastic bags or bottles, and of course, glass containers. Fractioning is carried out under severe sanitizing conditions both in the plant environment as well as in the process equipments. The following controls are made: at zero time (to); coliforms, fungii and yeasts (pre-incubated samples) and the "bio" flora present at 24 hours: pH, acidity, day extract, protides, lipids, ashes, total sugars, viscosity, syneresis and organoleptic is also controlled. An strict control on pre-incubates samples guarantees the quality of the product.

The viable population of the fermented milk so attained may be increase by concentrating the product. For instance, by evaporation at reduced pressure, by freezing or lyophilization.—Those are conventional methods widely applied in the diary industry and therefore, well known by the experts in the art.

In the above description about the inoculum's preparation, there should be pointed out the possibility of inoculating the culture medium with inocula of *Lactobacillus Casei* and *Lactobacillus Acidophilus* strains, where there is no availability of the inoculum combining both strains and also of initiation the culture of both strains separately and then mixing the inoculated culture media.

It is possible, in this way, to have concentrated products which provide a population of viable cells higher than the limit imposed to the culture operation (II). These products have an extended shelf life, as long as they are stored at temperatures in the range of 20° C.–40° C.

It is also possible to have available other forms of fermented milk, besides the drinkable fermented milk already commented. For instance, as fermented milk powder, obtained by aspersion of the fermented product at temperatures not higher than 60° C. in a first evaporation stage, up to a point of 30–45% total solids concentration (concentrated fermented milk, and later concentration by aspersion with hot air, in a circuit, for instance, as air 120° C.–150° C. (inlet temperature) and 60° C.–80° C. (outlet temperature). This powdered product can also be obtained by conventional lyophilization. These processes result in the attainment of a powder product (dried or lyophilized) of immediate reconstitution with water, milk or fruit juices.

The fermented milk powder, according to his invention, has shown to have a minimum shelf life of four months, when stores at temperatures of 20° C. to 25° C. and relative humidity between 40–65%. It is understood that the powder product has to be kept in containers of conventional permeability to oxygen and to steam.

The tests carried out with the present invention have made possible to verify a presence of 200.000 CFU per 200 ml of the product reconstituted with potable water, maintaining its macrocomponent contents, as corresponds to the composition of conventional whole milk powder (or skimmed, as the case may be, etc.).

The fermented milk of the invention, whether the powder product or the liquid product, contains additives such as saccharose, glucose, dyes and flavors, vitamins, etc.

The general features of the invented product are listed in the next table.

pH: 4.45–4.65 acidity: 65–82° D.

dry extract: 16% protides: 2,7% lipids: 3 min.

ashes: 0,5% total sugars: 9%

Flavours: natural or strawberry

In practice, the fermented lactic product of this invention, assumes several alternatives in its composition. An example may be seen in the following table;

|  | I | II | III | IV | V |
|---|---|---|---|---|---|
| Biologically active milk | 50% | 50% | 50% | 99.8% | 99.8% |
| Saccharose | 49.3% | 20.3% | — | — | — |
| Dextrose | — | 29% | 49.3%0 | — | — |
| Dye | 0.1% | 0.1% | 0.1% | — | — |
| Flavour | 0.6% | 0.6% | 0.6% | — | — |
| Vitamins | — | — | — | 0.1% | 0.1% |
| Minerals | — | — | — | 0.1% | — |

The fermented milk of the present invention has a higher proleolitic activity as compared with similar products. Said activity has been tested with the Hull Method and is expressed in mg. tyrosine %. Two samples of fermented milk has been processed and a fermented milk non acidified by *Streptococcus Thermophilus* has been used as a control. That is, samples 1 and 2, acidified with *Streptococcus Thermophilus* according to the invention, were compared against a fermented product without *Streptococcus Thermophilus* (control), and the results are listed in the following table:

|  | pH | Proleolitic Activity |
|---|---|---|
| SAMPLE 1 | 5 | 9.75 |
| SAMPLE 2 | 5 | 14.16 |
| CONTROL | 6 | 0.47 |

The proleolitic activity is provided by the use of cells of *Streptococcus Thermophilus*, while this activity is disregarded for the *Lactobacillus Acidophilus* and this activity is between 0.001–1.40 for the *Lactobacillus Casei*.

The powder product of this invention allows for instantaneous preparations of biologically active milk by the presence of the cultured lactic cells. The reconstituted liquid product has a pH close to liquid milk and it has good taste. It is a product that participates of the nutritional properties of milk, enriched by the components incorporated during the symbiotic culture of the already mentioned lactic bacteria and *Streptococcus Thermophilus*.

The invention provides also additional alternatives. It is possible, for instance, to add to milk or concentrated milk by evaporation to 3–45% of solids, 5–30% of the lactic strains cultured by symbiosis, eventually lyophilized, drying then the lactic material so integrated, be it by lyophilization or evaporation as already indicated (aspersion). This variant allows, for instance, to prepare "in situ" fermented milk powder or liquid, using the lyophilized or dried culture material, from the distribution centers.

The fermented milk powder as per this invention is a food which contributes the nutritional components of milk to the organism:—calcium, phosphorus, iron, proteins, amino acids, etc. The quality of milk powder as a nutritional dietary component is increased when it is fermented milk, because, to the contribution of the aforesaid nutrients has to be added the effects arising from the lactobacillus population, which permits to correct some nutritional deficiencies, on many occasions associated to the economic and sanitary deficit of impoverished population groups. The corrective value of the fermented milk of this invention has been searched since 1989 in our country, at the Buenos Aires Municipality's Summer Camps, Posadas Hospital, the Jesus de Tucumán Children's Hospital, the Yerba Buena medical Care Centre (Tucumán) and by Cerela (Centro de Referencia para Lactobacillus-Tucumán) (Lactobacillus Reference Centre), a dependency of CONICET (Consejo Nacional de Investigaciones Científicas Tecnológicas) (National Council for Scientific and Technological Research).

In the product of the present invention viable cells are present even after 60 days as from the elaboration of the product, therefore, due to its capacity to adhere to the epithelium, it may be concluded that the cells reproduction reaches levels considered as being protective such as $10^6$ CFU per gram of faeces. This longer viability is due to the stabilizer (carboximethylcellulose) added during the manufacturing process by means of which the acidity is regulated and, hence, the cells damage is prevented.

The shelf life of the milk of the present invention is unexpectedly long, 20 to 30 days in a liquid form and greater than 4 months in a lyophilized powder.

The acidity, pH and CFU/ml are shown in the following table for a sample of the invented product at an average temperature of 15° C., measured of 0, 7, 14, 21, 30, 37, 44, 51 and 60 days

|  | 0 days | 7 days | 14 days | 21 days | 30 days |
|---|---|---|---|---|---|
| CFU/ml | $1.2 \pm 0.35 \times 10^3$ | $1.4 \pm \times 10^8$ | $4.07 \pm \times 10^8$ | $3.20 \pm 10^8$ | $3.23 \pm 0.32 \times 10^8$ |
| pH | 6.25 | 6.00 | 5.55 | 5.20 | 5.35 |
| acidity ° D | | 106.10 | 130.84 | 123.77 | 167.98?! |

|  | 37 days | 44 days | 51 days | 60 days |
|---|---|---|---|---|
| CFU/ml | $5.30 \pm 0.99 \times 10^3$ | $5.10 + 0.14 \times 10^8$ | ND | $5.09 \pm 1.00 \times 10^8$ |
| pH | ND | 4.40 | 4.15 | 4.155.20 |
| acidity ° D | 150.29 | 148.53 | 152.06 | 144.99 |

The symbiotic culture of three cell lines of microorganisms, i.e. the *Streptococcus Thermophilus* acting in the fermentation and the probiotic cells, is highly beneficial to the human body. Thus the inventive product has unique characteristics relating to a nutritional health.

Preparation of inoculum for lyophilization or inoculation 100 liters of cow's milk with the following characteristics:

pH: 6.50–6.75 total non-fat solids: 8.2% w/v fat: 3.0% w/v pretreated at 90° C. during four minutes, with intermediate homogenization at 200 Kg/cm$^2$ and then cooled at 37° C., was inoculated with a culture of *Lactobacillus Casei* CRL 431 ATCC 55544 and *Lactobacillus Acidophilus* CRL 730 ATCC 55543 (from the strain bank), suspended in 5 ml of sterile physiological solution.

After homogenization, the inoculated material was incubated at 37° C. during a period ranging from 3 to 8 hours, according to the counting of the viable flora, amounting between 10$^6$ and 10$^9$ CFU/ml and pH between 6.30 and 6.60, valued according with milk's origin and composition.

The attained product is then cooled at 40° C. and concentrated, lyophilized or frozen, as per conventional techniques, then it is packed and stored. The container selection depends on the type of product: for the lyophilized product, it is practical to use 15 gr. pouches and 50 ml Tetra Rex type cardboard boxes.

Tests utilized have allowed to verify the viability of the product stored at 20° C.–40° C., during periods not less than 6 months.

Preparation of fluid fermented milk 5.0000 liters of cow's milk with the characteristics indicated in Example 1, pretreated at 78° C. during 20 seconds with intermediate homogenization at 200 Kg/cm$^2$, and then cooled at 37° C., were inoculated with *Lactobacillus Casei* CRL 431 ATCC 55544 and *Lactobacillus Acidophilus* CRL 730 ATCC 55543 at a rate of 2 gr. of the lyophilized product obtained in Example 1.

After homogenization, the inoculated material was kept at 37° C. during 4 hours. The fermented products is divided in conventional containers: for instance, Tetra Rex type cartonboxes.

Packed product is stored at 4° C.–8° C. and retains organoleptic characteristics similar to those of the practice milk and also its viscosity, with a ph between 6.3–6.7 during 20–30 days.

In practice, it has been demonstrated that the product so obtained is appropriate for daily consumption as pasteurized milk or as fermented milk.

Preparation of fermented milk Powder 100.000 liters of milk of the characteristics indicated in Example 1, pretreated at 90° C. during 90 seconds, were concentrated by evaporation in a conventional evaporator, up to a concentration of 35% of solids.

The evaporated material was cooled to 37° C. and then inoculated with 1 gr. of inoculum of each strain obtained in the Example 1 for each 100 liters of evaporated milk. After three hours of fermentation, the evaporated fermented milk was dried by aspersion at a conventional device. At the output of the aspersion apparatus, the lyophilized materials are injected with 1 gr. of inoculum of each strain for each 100 kg. of powder. The, lecithin is added to allow instant dilution and the powder is cooled at 43° C. and packed. For instance, in three-laminated pouch containers in a N$_2$ environment.

Under these conditions, the packed product maintains a shelf life of not less than 4 months, stored at 20–25° C. under relative humidity conditions of 40–65%.

From milk reconstituted from this powder product, at a rate of 130 gr. of powder/liter of potable water, a composition similar to that of the initial milk with 10$^3$ viable CFU of each Lactobacillus strain is attained.

In the table below, the taxonomic properties of lactobacillus of the previously mentioned strains are described.

| LACTOBACILLUS TAXONOMIC DATA | | |
|---|---|---|
| | *L. CASEI* CRL 431 ATCC 55544 | *L. ACIDOPHILUS* CRL 730 ATCC 55543 |
| Peptidoglyican type Fermentation of: | A4gamma | A4alfa |
| Arabinose | − | − |
| Cellobiose | + | + |
| Frutose | + | + |
| Galactose (24 hs)/+(72 hs) | + | − |
| Maltose | + | + |
| Mannitol | + | − |
| Mannose | + | + |
| Malesitose | + | − |
| Melibiose | − | − |
| Raffinose | − | − |
| Ramnose | + | + |
| Ribose | + | − |
| Salicin | + | + |
| Sorbitol | + | − |
| Saccharose | + | + |
| Trehalose | + | + |
| Xylose | − | − |
| Esculin hydrolysis | − | + |
| Plasmid presence | − | − |
| Antibiograma with Furadantine (Susceptibility to antibiotics test) | − | + |

(for identification of one in the presence of another).

I claim:

1. Process for manufacturing a biologically active fermented milk product, comprising the steps of:

a) preparing a mixture comprising a fluid phase and adding maltodextrin, non-fatty powder milk and sugar to the fluid phase, the fluid phase having a 4% fat content;

b) homogenizing and pasteurizing the mixture, wherein homogenization is carried out in only one step and pasteurization is made in a plate-type device;

c) fermenting the mixture by adding *Streptococcus thermophilus* at a temperature of 43° C. and a pH up to 4.5–4.6;

d) adding, under continuous and strong stirring, carboxymethylcellulose as a stabilizer until control parameters comprising pH: 4.55–4.65 and acidity: 63–70 dornic degrees are uniform in all the mixture;

e) homogenizing the mixture at 40° C. and 175 kg/cm$^2$ and letting the mixture to cool down to 4° C.; and f) inoculating the mixture with a bio ferment comprising cells of *Lactobacillus acidophilus* and *Lactobacillus casei*.

2. The process of claim 1, wherein the mixture is cooled down when the pH reaches 4.5–4.6 in step c).

3. The process of claim 1, wherein the homogenizing and pasteurizing of step b) are carried out under the following conditions:

homogenizing temperature: 70° C., homogenizing pressure: 150 kg/cm$^2$, pasteurization temperature: 90° C., and temperature at the end of pasteurization: 42–43° C.

4. The process of claim 1, wherein the inoculating step f) comprises inoculating a culture medium to a lactic base with inoculum containing cells of *Lactobacillus casei* CRL 431 ATTC 55544 and *Lactobacillus acidophilus* CRL 730 ATCC 55543, pre-cultured together in a lactic substrate, including the metabolites formed in said pre-culture, with a pH between 6 and 6.7, culturing the culture cells up to a population of at least $10^5$ CFU/ml and recovering the resulting fermented milk product.

5. The process of claim 4, wherein said inoculum's culture temperature is between 30° C. and 45° C.

6. The process of claim 4, further comprising concentration by evaporation, to form concentrated fermented milk at 30 to 40% w/v of total solids.

7. The process of claim 4, wherein the fermented milk is evaporated, further comprising drying to form fermented milk powder suitable for reconstitution.

8. The process of claim 4, wherein the fermented milk is evaporated and the evaporation comprises aspersion at a temperature not higher than 60° C., to form concentrated fermented milk at 30–40% w/v of total solids, and continuing the evaporation by aspersion with circulating inlet air between 120–125° C. and the outlet air between 60–80° C. to form fermented milk powder.

9. The process of claim 4, wherein the milk product is dehydrated by lyophilization to obtain fermented milk powder suitable for reconstitution.

10. The process of claim 4, wherein the lactic base culture is cow's milk.

11. A method for preparing an inoculum which contains two strains of Lactobacillus according to claim 4, comprising the inoculation of cells of *Lactobacillus casei* CRL 431 ATTC 55544 and *Lactobacillus acidophilus* CRL 730 ATCC 55543, at a pH between 6.30 and 6.60, up to a viable population of at least $10^6$–$10^9$ CFU/ml, into a lactic base culture medium, conditioned with (a) oligoelements selected from a group consisting of iron, cobalt, and molybdenum, and (b) additives selected from a group consisting of biotin and amino acids.

12. The method of claim 11, wherein said inoculum is dehydrated by lyophilization.

13. The process of claim 5, wherein said inoculum's culture temperature is between 35° C. and 38° C.

14. A fermented milk product in a liquid form or in a powder form which can be instantaneously reconstituted and is produced by the method of claim 1, comprising the co-culture of *Streptococcus thermophilus* and *Lactobacillus casei* CRL 431 ATTC 55544 and *Lactobacillus acidophilus* CRL 730 ATCC 55543 in a milk substrate, up to a concentration of Lactobacillus viable cells not less than $10^5$–$10^9$ CFU/ml.

15. The fermented milk product of claim 14, wherein said milk substrate comprises whole milk, skim milk or lactose-free milk by hydrolysis.

16. The fermented milk product of claim 14, comprising a product formed by the co-culture of cells of *Lactobacillus casei* CRL 431 ATTC 55544 and *Lactobacillus acidophilus* CRL 730 ATCC 55543 pre-cultured together in a lactic substrate, including the metabolites formed in said pre-culture with a pH between 6 and 6.7, wherein said inoculated cells are cultured up to a population of at least $10^5$ CFU/ml and the resulting fermented milk product is recovered.

17. The fermented milk product of claim 16, wherein said method further comprises concentration by aspersion to 30–45% w/v of total solids.

18. The fermented milk product of claim 16, wherein said product is produced by a method further comprising dehydration by lyophilization or aspersion with a 120–124° C. hot air current at the inlet and 60–80° C. at the outlet.

19. The fermented milk product of claim 14, wherein the *Streptococcus thermophilus* provides the milk with a proteolytic activity between 9 and 14% expressed in mg. of tyrosine.

* * * * *